(12) United States Patent
Gudik-Sorensen

(10) Patent No.: US 8,044,168 B2
(45) Date of Patent: Oct. 25, 2011

(54) AQUEOUS BINDER COMPOSITION FOR MINERAL FIBERS

(75) Inventor: Mads Gudik-Sorensen, Roskilde (DK)

(73) Assignee: Rockwool International A/S, Hedehusene (DK)

( * ) Notice: Subject to any disclaimer, the term of this patent is extended or adjusted under 35 U.S.C. 154(b) by 181 days.

(21) Appl. No.: 12/377,687

(22) PCT Filed: Sep. 5, 2007

(86) PCT No.: PCT/EP2007/059278
§ 371 (c)(1),
(2), (4) Date: Aug. 21, 2009

(87) PCT Pub. No.: WO2008/028923
PCT Pub. Date: Mar. 13, 2008

(65) Prior Publication Data
US 2010/0292354 A1    Nov. 18, 2010

Related U.S. Application Data

(60) Provisional application No. 60/859,526, filed on Nov. 17, 2006.

(30) Foreign Application Priority Data

Sep. 6, 2006  (EP) ..................... 06018685

(51) Int. Cl.
*C08G 64/00* (2006.01)
*C08G 63/02* (2006.01)

(52) U.S. Cl. ........ 528/272; 442/108; 442/172; 442/180; 524/271; 524/388; 528/322; 528/332

(58) Field of Classification Search ................. 442/108, 442/172, 180; 524/271, 388; 528/322, 332
See application file for complete search history.

(56) References Cited

U.S. PATENT DOCUMENTS

| | | | |
|---|---|---|---|
| 3,510,542 A | 5/1970 | Strand | |
| 5,318,990 A | 6/1994 | Strauss | |
| 5,661,213 A | 8/1997 | Arkens et al. | |
| 5,763,524 A | 6/1998 | Arkens et al. | |
| 6,706,853 B1 | 3/2004 | Stanssens et al. | |
| 6,730,730 B1 | 5/2004 | Hansen et al. | |
| 6,849,683 B2 | 2/2005 | Husemoen et al. | |
| 6,878,800 B2 | 4/2005 | Husemoen et al. | |
| 7,067,579 B2 | 6/2006 | Taylor et al. | |
| 7,607,258 B2 | 10/2009 | Holmenlund et al. | |
| 2002/0091185 A1 | 7/2002 | Taylor et al. | |
| 2003/0153690 A1 | 8/2003 | Husemoen et al. | |
| 2004/0024170 A1 | 2/2004 | Husemoen et al. | |
| 2005/0137318 A1 | 6/2005 | Husemoen et al. | |
| 2006/0111480 A1 | 5/2006 | Hansen et al. | |
| 2006/0117658 A1 | 6/2006 | Holmenlund et al. | |
| 2009/0227706 A1 | 9/2009 | Hansen et al. | |

FOREIGN PATENT DOCUMENTS

| | | |
|---|---|---|
| EP | 0 583 086 A1 | 2/1994 |
| EP | 0 990 727 A1 | 4/2000 |
| GB | 1 336 426 | 11/1973 |
| WO | 92/04824 A1 | 4/1992 |
| WO | 99/36368 A1 | 7/1999 |
| WO | 01/05725 A1 | 1/2001 |
| WO | 01/82683 A1 | 11/2001 |
| WO | 01/96460 A2 | 12/2001 |
| WO | 02/06178 A1 | 1/2002 |
| WO | 2004/007615 A1 | 1/2004 |
| WO | 2004/017718 A1 | 3/2004 |
| WO | 2006/061249 A1 | 6/2006 |

*Primary Examiner* — Terressa Boykin
(74) *Attorney, Agent, or Firm* — Greenblum & Bernstein, P.L.C.

(57) ABSTRACT

Disclosed is an aqueous binder composition for mineral fibers that comprises a water-soluble binder component produced by reacting, in one or more steps, at least one alkanolamine, at least one carboxylic anhydride and at least one polyalkylene glycol component selected from polyalkylene glycols, copolymers and derivates thereof and, optionally, treating the reaction product with a base.

29 Claims, No Drawings

US 8,044,168 B2

AQUEOUS BINDER COMPOSITION FOR MINERAL FIBERS

CROSS-REFERENCE TO RELATED APPLICATIONS

The present application claims priority under 35 U.S.C. §119(e) of U.S. provisional application No. 60/859,526, filed Nov. 17, 2006.

FIELD OF THE INVENTION

The present invention relates to an aqueous formaldehyde-free binder composition for mineral fibres, a method of producing a bonded mineral fibre product using said binder, and a mineral fibre product comprising mineral fibres in contact with the cured binder.

BACKGROUND OF THE INVENTION

Mineral fibre products generally comprise man-made vitreous fibres (MMVF) such as, e.g., glass fibres, ceramic fibres, basalt fibres, slag wool, mineral wool and stone wool, which are bonded together by a cured thermoset polymeric binder material. For use as thermal or acoustical insulation products, bonded mineral fibre mats are generally produced by converting a melt made of suitable raw materials to fibres in conventional manner, for instance by a spinning cup process or by a cascade rotor process. The fibres are blown into a forming chamber and, while airborne and while still hot, are sprayed with a binder solution and randomly deposited as a mat or web onto a travelling conveyor. The fibre mat is then transferred to a curing oven where heated air is blown through the mat to cure the binder and rigidly bond the mineral fibres together.

In the past, the binder resins of choice have been phenol/formaldehyde resins which can be economically produced and can be extended with urea prior to use as a binder. However, the desire to minimize Volatile Organic Compound (VOC) emissions from products in conjunction with existing and proposed legislation directed to the lowering or elimination of formaldehyde have led to the development of formaldehyde-free binders such as, for instance, the binder compositions based on polycarboxy polymers and polyols, as disclosed in EP-A-583086, EP-A-990727 and U.S. Pat. No. 5,318,990.

Another group of non-phenol/formaldehyde binders for mineral fibres are the addition/elimination reaction products of aliphatic and/or aromatic anhyrides with alkanolamines, e.g., as disclosed in WO 99/36368, WO 01/05725, WO 01/96460, WO 02/06178, WO 2004/007615 and WO 2006/061249. These mineral fibre binders are water soluble and exhibit excellent binding properties in terms of curing speed and curing density. However, despite these disclosures, there is a continuing need for identifying new formaldehyde-free, curable aqueous compositions suitable for use as a binder for mineral fibre products.

A type of product suffering from similar environmental problems associated with conventional phenol/formaldehyde binders are growth substrates for plants which are based upon man-made vitreous fibres or other porous substrates; see, for instance, GB-A-1336426. These substrates may, e.g., be provided in the form of slabs, blocks, plugs or other coherent products or in the form of granulate.

Conventional plant growth products generally comprise a binder, often a phenol-formaldehyde resin or urea-formaldehyde resin, which provides integrity to the product. After application of the binder, the products are subjected to curing at high temperatures in a curing oven.

It is essential that these plant growth substrates are able to take up and hold water, and therefore a certain wettability is required. Phenol-formaldehyde resins, and to lesser degree urea-formaldehyde resins are, however, found to impart water repellency to mineral wool products and, therefore, it is well-known to include a wetting agent in the plant growth substrate in order to achieve the desired hydrophilicity and wettability; see, for instance, WO 92/04824 and WO 01/82683. Such wetting agents must exhibit good environmental compatibility, in particular, low phytotoxicity. Moreover, in view of the working conditions employed during production of the plant growth substrates, they must have good thermal stability and also provide products having proper wet and dry compression strength in addition to the desired water-uptake capacity and water retaining capacity.

However, over time conventional wetting agents often are washed out of the plant growth substrate leaving a product of insufficient wettability and water retaining capacity.

SUMMARY OF THE INVENTION

Accordingly, it is an object of the present invention to provide an aqueous binder composition which is particularly suitable for bonding mineral fibres, which exhibits excellent binding characteristics in terms of curing speed and strength, has good water solubility and dilutability and is capable of providing bonded mineral fibre products with reduced or no emission of hazardous substances.

A further object of the present invention is to provide a mineral fibre product bonded with such a binder composition.

A particular object of the present invention is to provide a hydrophilic binder system which is particularly useful for bonding porous and especially fibrous substrates suitable for agricultural and horticultural purposes, for instance, as a plant growth substrate. The hydrophilic binder system should not be readily washed out of the bonded products by aqueous media and provide bonded products having improved long-term wettability, water uptake capacity and sinking time.

Another object of the present invention is to provide a process for preparing the hydrophilic binder system.

Still another object of the present invention is to provide bonded porous substrate products, for instance, plant growth substrates, having improved long-term wettability, water uptake capacity and sinking time.

In accordance with a first aspect of the present invention, there is provided an aqueous binder composition for mineral fibres comprising a water-soluble binder component obtainable by reacting, in one or more steps, at least one alkanolamine, at least one carboxylic anhydride and at least one polyalkylene glycol component selected from polyalkylene glycols, copolymers and derivates thereof and, optionally, treating the reaction product with a base.

In accordance with a second aspect of the present invention, there is provided a method of producing a bonded mineral fibre product which comprises the steps of contacting the mineral fibres or mineral fibre product with an aqueous binder composition as defined above, and curing the binder composition.

In accordance with a third aspect of the present invention, there is provided a mineral fibre product comprising mineral fibres in contact with the cured binder composition defined above.

In accordance with a fourth aspect of the present invention, there are provided bonded porous substrates, including plant growth substrate products, which comprise the cured binder composition defined above.

DESCRIPTION OF THE PREFERRED EMBODIMENTS

The formaldehyde-free aqueous binder composition according to the present invention comprises a water-soluble binder component obtainable by reacting, in one or more steps, at least one alkanolamine, at least one carboxylic anhydride and at least one polyalkylene glycol component selected from polyalkylene glycols, copolymers and derivates thereof and, optionally, treating the reaction product with a base.

In a specific embodiment of the present invention, the polyalkylene glycol component is pre-reacted with an acid component (C) selected from di- and polycarboxylic acids and anhydrides thereof to form a polyalkylene glycol ester having carboxylic acid functionality.

The alkanolamine, carboxylic anhydride, polyalkylene glycol and optional acid components may be reacted in a number of different ways, including the following.

In one embodiment, the binder composition is obtainable by
a) reacting a carboxylic anhydride (A), the alkanolamine and the polyalkylene glycol component,
b) reacting the reaction mixture obtained in step (a) with a carboxylic anhydride (B), and
c) optionally, treating the reaction product with a base.

In another embodiment of the present invention, the binder composition is obtainable by
a) reacting the alkanolamine and a carboxylic anhydride (A),
b) reacting the reaction mixture obtained in step (a) with a carboxylic anhydride (B) and the polyalkylene glycol component, and
c) optionally, treating the reaction product with a base.

In this embodiment of the invention, the carboxylic anhydride (B) and the polyalkylene glycol component may be reacted together in a single stage or separately in consecutive stages.

In still another embodiment of the present invention, the binder composition is obtainable by
a) reacting the polyalkylene glycol component and an acid component (C) selected from di- and polycarboxylic acids and anhydrides thereof to form a polyalkylene glycol ester having carboxylic acid functionality,
b) reacting the reaction mixture obtained in step (a) with the alkanolamine and a carboxylic anhydride (A),
c) reacting the reaction mixture obtained in step (b) with a carboxylic anhydride (B), and
d) optionally, treating the reaction product with a base.

In a further embodiment of the present invention, the binder composition is obtainable by
a) reacting the polyalkylene glycol component and an acid component (C) selected from di- and polycarboxylic acids and anhydrides thereof to form a polyalkylene glycol ester having carboxylic acid functionality,
b) reacting the reaction mixture obtained in step (a) with the alkanolamine and a carboxylic anhydride (A),
c) reacting the reaction mixture obtained in step (b) with a carboxylic anhydride (B), and
d) optionally, treating the reaction product with a base.

In another embodiment of the present invention, the binder composition is obtainable by
a) reacting the alkanolamine with a carboxylic anhydride (A),
b) reacting the reaction mixture obtained in step (a) with a carboxylic anhydride (B),
c) reacting the polyalkylene glycol component and an acid component (C) selected from di- and polycarboxylic acids and anhydrides thereof to form a polyalkylene glycol ester having carboxylic acid functionality,
d) combining the reaction mixtures obtained in steps (b) and (c), and
e) optionally, treating the reaction product with a base.

In still another embodiment of the present invention, the binder composition is obtainable by
a) reacting the alkanolamine with a carboxylic anhydride (A),
b) reacting the reaction mixture obtained in step (a) with a carboxylic anhydride (B) and a polyalkylene glycol ester having carboxylic acid functionality obtained by reacting the polyalkylene glycol component and an acid component (C) selected from di- and polycarboxylic acids and anhydrides thereof, and
c) optionally, treating the reaction product with a base.

In a further embodiment of the present invention, the binder composition is obtainable by
a) reacting an acid component (C) selected from di- and polycarboxylic acids and anhydrides thereof, the alkanolamine and the polyalkylene glycol component,
b) reacting the reaction mixture obtained in step (a) with a carboxylic anhydride (A),
c) reacting the reaction mixture obtained in step (b) with a carboxylic anhydride (B), and
d) optionally, treating the reaction product with a base.

It should however be noted that the present invention is not limited to the above-mentioned preferred embodiments but encompasses various other reaction sequences involving the reaction of alkanolamine, carboxylic anhydride, polyalkylene glycol and optional acid components.

Alkanolamine

The preferred alkanolamines for use in the preparation of the binder composition according to the present invention are alkanolamines having at least two hydroxy groups such as, for instance, alkanolamines represented by the formula

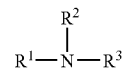

wherein $R^1$ is hydrogen, a $C_{1-10}$ alkyl group or a $C_{1-10}$ hydroxyalkyl group; and $R^2$ and $R^3$ are $C_{1-10}$ hydroxyalkyl groups.

Preferably, $R^2$ and $R^3$, independently are $C_{2-5}$ hydroxyalkyl groups, and $R^1$ is hydrogen, a $C_{1-5}$ alkyl group or a $C_{2-5}$ hydroxyalkyl group. Particularly preferred hydroxyalkyl groups are β-hydroxyalkyl groups.

Specific examples of suitable alkanolamines are diethanolamine, triethanolamine, diisopropanolamine, triisopropanolamine, methyldiethanolamine, ethyldiethanolamine, n-butyldiethanofamine, methyldiisopropanolamine, ethylisopropanolamine, ethyldiisopropanolamine, 3-amino-1,2-propanediol, 2-amino-1,3-propanediol and tris(hydroxymethyl)aminomethane. Diethanolamine is the currently preferred alkanolamine.

In accordance with the present invention, glycerol may be used in addition to, or as a replacement of, the alkanolamine Up to 100%, preferably 10% to 99 or 100% and, more preferably, 25% to 90% of the alkanolamine may be replaced by glycerol Carboxylic Anhydride The carboxylic anhydride reactant may be selected from saturated or unsaturated aliphatic and cycloaliphatic anhydrides, aromatic anhydrides and mixtures thereof, saturated or unsaturated cycloaliphatic anhydrides, aromatic anhydrides and mixtures thereof being preferred.

In the above-mentioned preferred embodiments of the invention, the carboxylic anhydrides (A) and (B) are the same or different and are independently selected from cycloaliphatic and aromatic anhydrides or mixtures thereof.

For example, one of the carboxylic anhydrides (A) and (B) may be a cycloaliphatic anhydride and the other an aromatic anhydride. In a preferred embodiment, both carboxylic anhydrides (A) and (B) are the same or different aromatic anhydrides.

Specific examples of suitable aliphatic carboxylic anhydrides are succinic anhydride, maleic anhydride and glutaric anhydride. Specific examples of suitable cycloaliphatic anhydrides are tetrahydrophthalic anhydride, hexahydrophthalic anhydride, methyltetrahydrophthalic anhydride and nadic anhydride, i.e. endo-cis-bicyclo[2 2.1]-5-heptene-2,3-dicarboxylic anhydride Specific examples of suitable aromatic anhydrides are phthalic anhydride, methylphthalic anhydride, trimellitic anhydride and pyromellitic dianhydride.

Polyalkylene Glycol Component

The polyalkylene glycol component used in the preparation of the binder composition according to the present invention is preferably selected from polyalkylene glycols such as polyethylene glycol (PEG), polypropylene glycol (PPG), polybutylene glycol (PBG) and mixtures and copolymers thereof. Also suitable are polyalkylene glycol derivatives including but not limited to polyalkylene glycol ethers and esters such as, for instance, mono alkyl ethers and esters, e.g. methyl PEG, ethyl PEG, propyl PEG, butyl PEG and mixtures and copolymers thereof.

The polyalkylene glycol component preferably has a molecular weight of between 150 and 20,000; more preferably between 150 and 10,000; in particular, between 200 and 5,000; and most preferably, between 300 and 1,000.

Specific examples of commercially available polyalkylene glycol components are PEG 200, PEG 300, PEG 400, PEG 600, PEG 800, PEG 1000, PEG 2000, PEG 5000, PEG 10000, PEG 20000, and PEG 50000

Acid Component

The optionally used acid component (C) is at least one di- or polycarboxylic acid or an anhydride thereof. The acid component is preferably selected from aliphatic, cycloaliphatic, saturated, unsaturated and aromatic carboxylic acids and anhydrides.

More preferably, the acid component is selected from aliphatic di- or polycarboxylic acids, including saturated di- or polycarboxylic acids having 3 to 7 carbon atoms, such as succinic acid, glutaric acid, adipic acid, citric acid and malonic acid, or anhydrides thereof; and unsaturated di- or polycarboxylic acids having 4 to 7 carbon atoms or anhydrides thereof, such as maleic acid, fumaric acid and maleic anhydride; cycloaliphatic di- or polycarboxylic acids or anhydrides thereof, such as tetrahydrophthalic acid, hexahydrophthalic acid and methyltetrahydrophthalic acid and the corresponding anhydrides; aromatic di- or polycarboxylic acids or anhydrides thereof, such as phthalic acid, methylphthalic acid, trimellitic acid, pyromellitic acid and the corresponding anhydrides.

Reaction Conditions

In the preparation of the binder composition, the proportion of the alkanolamine, carboxylic anhydride, polyalkylene glycol and optional acid reactants is preferably selected such that the ratio of equivalents of amine plus hydroxy groups (NH+OH) to equivalents of carboxy groups (COOH) is within the range of about 0.4 to 2.0, more preferably about 0.6 to 1.75, and most preferably about 1.0 to 1.75.

The polyalkylene glycol component is preferably used in amounts of up to 30%, taken as weight percentage of the dry solid binder, preferably in an amount of from about 0.01 to about 20%, more preferably about 0.1 to about 10%.

If glycerol is used in the reaction, its amount is preferably such that the equivalent ratio of glycerol OH groups to total equivalents of amine groups plus hydroxy groups (NH+OH) is 0.2 to 0.9, preferably 0.3 to 0.8 and, more preferably, 0.5 to 0.8

The reaction between the alkanolamine, carboxylic anhydride, polyalkylene glycol and optional acid reactants is generally carried out at a reaction temperature of between room temperature and the boiling point of any solvent employed or the boiling point of any of the reactants, preferably at a reaction temperature of at least about 50° C. and up to about 200° C. In a preferred embodiment and, in particular, when two different anhydrides are employed, the alkanolamine is first heated to a temperature of at least about 50° C., then the first anhydride is added and the reaction temperature is raised to at least about 70° C., preferably at least about 95° C. and more preferably at least about 125° C., at which temperature the second anhydride is added to the reaction mixture when substantially all the first anhydride has dissolved and/or reacted. Increasing the reaction temperature from 70-95° C. to 100-200° C. allows a higher conversion of monomers to oligomers. In this case, a preferred temperature range is 105-170° C., more preferably 110-150° C.

The reaction may optionally be carried out in the presence of a catalyst, preferably an amine catalyst such as, e.g., an aliphatic amine like triethylamine or an aromatic or heterocyclic amine like imidazole.

Optionally, the reaction may also be carried out in the presence of an aprotic, polar solvent such as a ketone like acetone, an ether like tetrahydrofurane, an ester like acetoacetate, or an amine like pyridine.

Water may be added after the first anhydride has reacted, either together with the second anhydride or before addition of the second anhydride, or at the end of the reaction in order to stop the reaction and to make the binder easily pumpable.

In order to improve the water solubility and dilutability of the binder, a base may be added up to a pH of about 8, preferably a pH of between about 5-8, and more preferably a pH of about 6-7. Furthermore, the addition of a base will cause at least partial neutralization of unreacted acids and a concomitant reduction of corrosiveness Normally, the base will be added in an amount sufficient to achieve the desired water solubility or dilutability. The base is preferably selected from volatile bases which will evaporate at or below curing temperature and hence will not influence curing. Specific examples of suitable bases are ammonia ($NH_3$) and organic amines such as diethanolamine, triethanolamine and dimethylethanolamine. The base is preferably added to the reaction mixture after the reaction has been actively stopped by adding water.

Furthermore, one or more polycarboxy crosslinking agents may be added after termination of the reaction and, optionally, together with the base. Suitable polycarboxy crosslinking agents are, e.g., homopolymers and copolymers of acidic monomers such as acrylic acid, alkylacrylic acid (e.g. methacrylic acid) and maleic acid, and copolymers of such acidic monomers and acrylates. The weight percentage of these polycarboxy crosslinking agents is at least 0.5, preferably at least 10 wt %, and up to 50, preferably up to 30 wt %, more preferably up to 15 wt %, based on the binder composition.

Other Components

The binder composition according to the present invention may comprise one or more conventional binder additives.

These include, for instance, silanes such as, e.g., γ-aminopropyltriethoxy-silane, curing accelerators such as, e.g., β-hydroxylalkylamides; the free acid and salt forms of phosphoric acid, phosphonic acid, phosphinic acid, citric acid and adipic acid. Other strong acids such as boric acid, sulphuric acid, nitric acid and p-toluenesulphonic acid may also be used, either alone or in combination with the just mentioned acids, in particular with phosphoric, phosphonic or phosphinic acid. Other suitable binder additives are thermal stabilizers; UV stabilizers; hydrolytic stability-improving agents such as monoalkanolamines, allylamines, peroxy compounds, epoxy compounds, compounds having at least one long-chain aliphatic moiety and at least one functional group, and SBR latices; surface active agents; fillers such as clay, silicates, and magnesium sulfate; pigments such as titanium dioxide; corrosion inhibitors; urea; silica; magnesium hydroxide and others.

These binder additives and adjuvants are used in conventional amounts generally not exceeding 20% by weight of the binder solids The amount of curing accelerator in the binder composition is generally between 0.05 to 5 wt. %, based on solids, and also the amount of silanes is generally between 0.05 to 5 wt. %.

If appropriate, co-binders such as, e.g., carbohydrates may be employed in amounts of, for instance, up to 25-30 wt. %, based on binder solids Final Binder Composition The binder composition according to the present invention preferably has a solids content of from 10 to 40 wt % This is often the concentration range of the binder in storage containers before use.

In a form ready for application, the binder preferably has a solids content of from 1 to 30 wt %.

For transportation, a solids content of the binder composition of from 60 to 75 wt % is frequently employed.

In order to achieve adequate application properties and, in particular, spraying properties, the viscosity of the binder composition may be adjusted. This is accomplished, for instance, by controlling the type and concentration of binder components in the aqueous binder system. Viscosity may be kept within the desired ranges e.g. by controlling the molecular weight of binder component (lower reaction temperature, stopping the reaction by adding water at an earlier reaction stage, etc.), and by properly adjusting the relative amounts of the binder components and water solvent Mineral Fibre Product The formaldehyde-free aqueous binder composition according to the present invention may be applied to mineral fibres or mineral fibre products by conventional techniques such as, e.g., air or airless spraying, rotating disc atomization, padding, saturating, roll coating, curtain coating, beater deposition, or the like.

The mineral fibres may be any of man-made vitreous fibres (MMVF), glass fibres, ceramic fibres, basalt fibres, slag wool, rock wool, stone wool and others. The mineral fibre products are, for instance, woven and nonwoven fabrics, mats, batts, slabs, sheets and other shaped articles which find use, for example, as acoustic insulation materials, filter stock, and in other applications.

For the manufacture of acoustic insulation products and horticultural products, the binder is normally applied in an amount of 0.1 to 15%, preferably 0.3-10%, of the bonded mineral fibre product.

In general, the binder composition is applied, normally by spraying, immediately after fiberization of the mineral melt, whereupon the coated mineral wool is cured in a curing oven wherein heated air is passed through the mineral wool web to cure the binder. Typically, the curing oven is operated at a temperature of from about 200° C. to about 350° C. Preferably, the curing temperature ranges from about 200° C. to about 300° C., and more preferably from about 225 to about 290° C. Generally, the curing oven residence time is from 30 seconds to 20 minutes, depending on, for instance, the product density.

Besides conventional curing by heat (e.g. heated air) other curing methods may be used, for example curing with microwave or infrared radiation. If desired, the mineral wool web may also be subjected to a shaping process before curing.

The bonded mineral fibre product emerging from the curing oven in the form of e.g. a batt may be cut to a desired format and, if appropriate, compressed for packaging and shipping. It may also be employed as an intermediate for the manufacture of shaped articles and composite materials.

Although the formaldehyde-free aqueous binder composition according to the present invention is particularly useful for bonding mineral fibres, it may equally be employed in other applications typical for binders and sizing agents, e.g. as a binder for foundry sand, glass fibre tissue, cellulosic fibres, non-woven paper products, composites, molded articles, coatings etc.

Another field of application of particular interest is the production of porous and especially fibrous bonded substrates suitable for agricultural and horticultural purposes, for instance, as a plant growth substrate. In that instance, the porous substrate may be selected from any substrate which is conventionally employed for agricultural and horticultural purposes and, in particular, for plant growth substrates. Specific examples of suitable substrate materials are, for instance, man-made vitreous fibres such as mineral wool, stone wool, glass wool or slag wool; natural fibres, particularly plant fibres such as coco fibres and cotton; cellulosic and lignocellulosic fibres; and inorganic materials such as perlite beads and intumescent inorganic materials.

After application of the binder system according to the present invention to the porous substrate, the bonded product is cured employing the curing conditions described above. When using natural fibres or other organic materials as a substrate, the curing temperature should, of course, not be above the decomposition or burning temperature of these materials.

After curing, the bonded substrate may be cut or shaped into a desired form such as, e.g., slabs, mats, blocks, plugs, cubes or the like The bonded porous product obtained is useful for agricultural, horticultural and architectural purposes, for instance, as a plant growth material and for roof gardens. In order to prepare a plant growth material, the bonded porous product may be combined in the usual manner with other composite layers (wrapping foil etc.) and additives such as, for instance, nutrients/fertilizers and fillers like, e.g., clay.

Owing to their improved hydrophilicity, the bonded porous products according to the present invention are of particular use in plant growth environments as disclosed in WO 2004/

017718 A1 comprising a first growth substrate which has a first water uptake capacity and a first sinking time, and the first growth substrate is in fluid communication with a discrete second substrate which has a second water uptake capacity lower than the first water uptake capacity and a second sinking time shorter than the first sinking time. "Water uptake capacity" and "sinking time" are as defined in WO 2004/017718 A1 with a lower sinking time representing a greater hydrophilicity value. Thus, the second substrate preferably has a degree of hydrophilicity when dry which is greater than that of the first growth substrate.

Preferably the two substrates are contained in a plant growth container such as a pot. The system is adapted so that plants may be positioned for growth in the first growth substrate, which is preferably peat or coir.

The following examples are intended to further illustrate the aqueous binder composition and the use thereof as a binder for mineral fibre products. Parts and percentages are by weight, unless indicated otherwise. The solids content is determined in accordance with DIN 16916, Part 2, Section 5.13, with the modification that the sample is heated at 200° C. for one hour.

In the examples, the following abbreviations are used:
DEA: diethanolamine
PTA: phthalic anhydride
THPA: tetrahydrophthalic anhydride
TMA: trimellitic anhydride
PEG: polyethylene glycol

Example 1

18 g of PEG 300 (7.5% w/w based on binder dry solids) and 13.3 g of PTA are placed in a round-bottomed reaction flask fitted with a mechanical stirrer. The mixture is allowed to react at 95° C. for 16 hours. Then, additional 89.1 g of PTA are added together with 105 g of DEA, and the reaction temperature is allowed to rise to 130° C. After 45 minutes, 57.6 g of TMA are added and the temperature is maintained for 1 hour. The reaction mixture is cooled to 110° C., and 147 g of water are added. The mixture is stirred at 70° C. for 1 hour after which it is cooled to ambient temperature. Then, 4.6 g of phosphinic acid and 46 ml of a 25% aqueous ammonia solution are added under stirring. After adding 2 g of amino silane, water is added until a dilution of the binder composition of 18% dry solids is obtained.

Example 2

105 g of DEA are placed in a round-bottomed reaction flask fitted with a mechanical stirrer and heated to 60° C. 97.3 g of THPA are then added in small portions, and the reaction temperature is raised to 130° C. The mixture is allowed to react for 45 minutes after which 57.6 g of TMA and 6 g of PEG 400 (2.5% w/w based on binder dry solids) are added. The mixture reacts further for one hour after which it is cooled to 110° C., and 147 g of water are slowly added to the reaction mixture and stirred until a tan clear mixture is obtained. Then, 4.6 g of phosphinic acid and 39 ml of a 25% aqueous ammonia solution are added under stirring. Water is added until a dilution of the binder composition of 18% dry solids is obtained.

Example 3

Mixture A
105 g of DEA are placed in a round-bottomed reaction flask fitted with a mechanical stirrer and heated to 60° C. 91.3 g of THPA are then added in small portions, and the reaction temperature is raised to 130° C. The mixture is allowed to react for 45 minutes after which 57.6 g of TMA are added. The mixture reacts further for one hour after which it is cooled to 110° C., 147 g of water are slowly added to the reaction mixture and stirred until a tan clear mixture is obtained. The isolated resin cooled to ambient temperature.

Mixture B
A reaction product is made by adding 19.8 g of PTA to 40.1 g of PEG 600 (5% w/w based on binder dry solids) in a round-bottomed reaction flask fitted with a mechanical stirrer. The mixture is allowed to react at 95° C. for 16 hours, and then cooled.

The finished binder composition is made by combining 10.1 g of Mixture A and 0.4 g of Mixture B and adding to this mixture 0.12 g of phosphinic acid and 1.2 ml of a 25% aqueous ammonia solution as well as 18 g of water.

What is claimed is:

1. An aqueous binder composition for mineral fibers, wherein the binder composition comprises a water-soluble binder component which is produced by reacting, in one or more steps, at least one alkanolamine, at least one carboxylic anhydride and at least one polyalkylene glycol component selected from one or more of polyalkylene glycols, copolymers and derivates thereof and, optionally, treating the reaction product with a base.

2. The binder composition of claim 1, wherein the polyalkylene glycol component has been pre-reacted with at least one acid component (C) selected from one or more of di- and polycarboxylic acids and anhydrides thereof to form a polyalkylene glycol ester having carboxylic acid functionality.

3. The binder composition of claim 1, wherein the composition is produced by
    (a) reacting at least one carboxylic anhydride (A), at least one alkanolamine and at least one polyalkylene glycol component,
    (b) reacting a reaction mixture obtained in (a) with at least one carboxylic anhydride (B), and
    (c) optionally, treating a reaction product obtained in (b) with a base.

4. The binder composition of claim 1, wherein the composition is produced by
    (a) reacting at least one alkanolamine and at least one carboxylic anhydride (A),
    (b) reacting a reaction mixture obtained in (a) with at least one carboxylic anhydride (B) and at least one polyalkylene glycol component, and
    (c) optionally, treating a reaction product obtained in (b) with a base.

5. The binder composition of claim 4, wherein in (b) at least one carboxylic anhydride (B) and the at least one polyalkylene glycol component are reacted in a single stage or in consecutive stages.

6. The binder composition of claim 2, wherein the composition is produced by
    (a) reacting at least one polyalkylene glycol component and at least one acid component (C) selected from one or more of di- and polycarboxylic acids and anhydrides thereof to form a polyalkylene glycol ester having carboxylic acid functionality,
    (b) reacting a reaction mixture obtained in (a) with at least one alkanolamine and at least one carboxylic anhydride (A),
    (c) reacting a reaction mixture obtained in (b) with at least one carboxylic anhydride (B), and
    (d) optionally, treating a reaction product obtained in (c) with a base.

7. The binder composition of claim 2, wherein the composition is produced by
- (a) reacting at least one alkanolamine with at least one carboxylic anhydride (A),
- (b) reacting a reaction mixture obtained in (a) with at least one carboxylic anhydride (B),
- (c) reacting at least one polyalkylene glycol component and at least one acid component (C) selected from one or more of di- and polycarboxylic acids and anhydrides thereof to form a polyalkylene glycol ester having carboxylic acid functionality,
- (d) combining reaction mixtures obtained in (b) and (c), and
- (e) optionally, treating a reaction product obtained in (d) with a base.

8. The binder composition of claim 2, wherein the composition is produced by
- (a) reacting at least one alkanolamine with at least one carboxylic anhydride (A),
- (b) reacting a reaction mixture obtained in (a) with at least one carboxylic anhydride (B) and at least one polyalkylene glycol ester having carboxylic acid functionality produced by reacting at least one polyalkylene glycol component and at least one acid component (C) selected from one or more of di- and polycarboxylic acids and anhydrides thereof, and
- (c) optionally, treating a reaction product obtained in (b) with a base.

9. The binder composition of claim 1, wherein the composition is produced by
- (a) reacting at least one acid component (C) selected from one or more of di- and polycarboxylic acids and anhydrides thereof, at least one alkanolamine and at least one polyalkylene glycol component,
- (b) reacting a reaction mixture obtained in (a) with at least one carboxylic anhydride (A),
- (c) reacting a reaction mixture obtained in (b) with at least one carboxylic anhydride (B), and
- (d) optionally, treating a reaction product obtained in (c) with a base.

10. The binder composition of claim 1, wherein the at least one polyalkylene glycol component is selected from one or more of polyethylene glycol (PEG), polypropylene glycol (PPG), polybutylene glycol (PBG), copolymers and derivatives thereof.

11. The binder composition of claim 1, wherein glycerol is used in addition to, or as a complete or partial replacement of, the at least one alkanolamine.

12. The binder composition of claim 3, wherein the carboxylic anhydrides (A) and (B) are the same or different and are independently selected from saturated or unsaturated, aliphatic or cycloaliphatic anhydrides and aromatic anhydrides or mixtures thereof.

13. The binder composition of claim 12, wherein one of the carboxylic anhydrides (A) and (B) comprises a cycloaliphatic anhydride and the other one comprises an aromatic anhydride.

14. The binder composition of claim 12, wherein the carboxylic anhydrides (A) and (B) comprise the same or different aromatic anhydrides.

15. The binder composition of claim 12, wherein the cycloaliphatic anhydrides comprise one or more of tetrahydrophthalic anhydride, hexahydrophthalic anhydride and methyl-tetrahydrophthalic anhydride.

16. The binder composition of claim 12, wherein the aromatic anhydrides comprise one or more of phthalic anhydride, methylphthalic anhydride, trimellitic anhydride and pyromellitic dianhydride.

17. The binder composition of claim 2, wherein the di- or polycarboxylic acids or anhydrides are selected from maleic acid, fumaric acid, tetrahydrophthalic acid, hexahydrophthalic acid, methyl-tetrahydrophthalic acid, phthalic acid, methylphthalic acid, trimellitic acid, pyromellitic acid and the corresponding anhydrides.

18. The binder composition of claim 1, wherein the at least one alkanolamine comprises one or more of diethanolamine, triethanolamine, diisopropanolamine, triisopropanolamine, methyldiethanolamine, ethyldiethanolamine, n-butyldiethanolamine, methyldiisopropanolamine, ethylisopropanolamine, ethyldiisopropanolamine, 3-amino-1,2-propanediol, 2-amino-1,3-propanediol and tris(hydroxymethyl)aminomethane.

19. The binder composition of claim 1, wherein a proportion of the at least one alkanolamine, the at least one carboxylic anhydride, the at least one polyalkylene glycol and the optional acid reactants is selected such that a ratio of equivalents of amine plus hydroxy groups (NH+OH) to equivalents of carboxy groups (COOH) is within the range of from about 0.4 to about 2.0.

20. The binder composition of claim 1, wherein the polyalkylene glycol component is used in an amount of up to about 30%, taken as weight percentage of dry solid binder.

21. The binder composition of claim 1, further comprising a curing accelerator.

22. The binder composition of claim 21 which comprises phosphinic acid as a curing accelerator.

23. A method of producing a bonded mineral fiber product which comprises contacting mineral fibers or a mineral fiber product with a binder composition according to claim 1, and curing the binder composition.

24. The method of claim 23 wherein curing is effected at a curing temperature of from about 200° C. to about 350° C.

25. A mineral fiber product comprising mineral fibers in contact with a cured binder composition according to claim 1.

26. A bonded porous substrate comprising a cured binder composition according to claim 1.

27. The bonded porous substrate of claim 26 which comprises man-made vitreous fibers or natural fibers, including plant fibers, cellulosic and lignocellulosic fibers.

28. The bonded porous substrate of claim 26 which comprises an inorganic porous material such as perlite beads.

29. A plant growth substrate product which comprises the bonded porous substrate according to claim 26.

* * * * *